US010176098B2

(12) United States Patent
Deguchi

(10) Patent No.: US 10,176,098 B2
(45) Date of Patent: Jan. 8, 2019

(54) METHOD AND APPARATUS FOR DATA CACHE IN CONVERGED SYSTEM

(71) Applicant: HITACHI, LTD., Tokyo (JP)

(72) Inventor: Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 36 days.

(21) Appl. No.: 15/323,942

(22) PCT Filed: Nov. 17, 2014

(86) PCT No.: PCT/US2014/065976
§ 371 (c)(1),
(2) Date: Jan. 4, 2017

(87) PCT Pub. No.: WO2016/080953
PCT Pub. Date: May 26, 2016

(65) Prior Publication Data
US 2017/0147491 A1 May 25, 2017

(51) Int. Cl.
*G06F 9/50* (2006.01)
*G06F 12/0806* (2016.01)
*G06F 12/0895* (2016.01)

(52) U.S. Cl.
CPC ............ *G06F 12/0806* (2013.01); *G06F 9/50* (2013.01); *G06F 12/0895* (2013.01); *G06F 2212/1008* (2013.01); *G06F 2212/1041* (2013.01); *G06F 2212/62* (2013.01)

(58) Field of Classification Search
USPC .......................................................... 711/119
See application file for complete search history.

(56) References Cited

U.S. PATENT DOCUMENTS

| | | | | |
|---|---|---|---|---|
| 7,913,042 | B2 * | 3/2011 | Ogihara | G06F 3/0617 707/659 |
| 8,769,207 | B2 * | 7/2014 | Jiao | G06F 12/084 711/133 |
| 8,856,783 | B2 | 10/2014 | Sharp et al. | |
| 2005/0216695 | A1 * | 9/2005 | Bono | G06F 12/109 711/203 |
| 2006/0112219 | A1 | 5/2006 | Chawla et al. | |

(Continued)

OTHER PUBLICATIONS

International Search Report and Written Opinion for PCT App No. PCT/US2014/065976 dated Feb. 24, 2015, 20 pgs.

*Primary Examiner* — Mano Padmanabhan
*Assistant Examiner* — Jean C Edouard
(74) *Attorney, Agent, or Firm* — Procopio, Cory, Hargreaves & Savitch LLP

(57) ABSTRACT

A computer device including a node having a storage device having a plurality of first internal address spaces, a cache memory, and a processor may be provided. The processor may provide a virtual volume. The virtual volume may have a plurality of virtual address spaces including first virtual address spaces corresponding to the plurality of first internal address spaces. The processor may cache data of a virtual address space in a first cache space of the cache memory by associating the virtual address space with the first cache space. Further, the processor may cache data of a first internal address space of the first internal address spaces in a second cache space of the cache memory by associating the first internal address space with the second cache space.

16 Claims, 20 Drawing Sheets

(56) References Cited

U.S. PATENT DOCUMENTS

| | | | | |
|---|---|---|---|---|
| 2006/0282618 | A1* | 12/2006 | Thompson | G06F 12/0804 711/118 |
| 2007/0101083 | A1* | 5/2007 | Ogihara | G06F 3/0617 711/165 |
| 2008/0071982 | A1* | 3/2008 | Kanno | G06F 3/0605 711/112 |
| 2008/0244199 | A1* | 10/2008 | Nakamura | G06F 17/30197 711/156 |
| 2010/0199042 | A1* | 8/2010 | Bates | G06F 11/2064 711/114 |
| 2011/0082997 | A1* | 4/2011 | Yochai | G06F 3/0605 711/171 |
| 2012/0011312 | A1* | 1/2012 | Dorfman | G06F 1/3221 711/113 |
| 2013/0036286 | A1* | 2/2013 | Jin | G06F 3/0605 711/170 |
| 2013/0091328 | A1* | 4/2013 | Yoshihara | G06F 12/0817 711/118 |
| 2013/0138884 | A1* | 5/2013 | Kawamura | G06F 12/0866 711/119 |

* cited by examiner

| LU (505) | cache flag (510) | Write through (515) |
|---|---|---|
| 01 | ON | ON |
| 02 | OFF | OFF |
| 03 | OFF | OFF |
| 04 | OFF | OFF |
| ... | ... | ... |

| device (605) | cache flag (610) |
|---|---|
| 11 | ON |
| 12 | OFF |
| 13 | ON |
| 14 | ON |
| ... | ... |

| LU | Address | Cache address |
|---|---|---|
| 01 | 0 | 512 |
| | 512 | - |
| | 1024 | - |
| ... | ... | ... |
| 02 | 0 | 1024 |
| | 512 | - |
| | 1024 | - |
| ... | ... | ... |

705 (725, 730, 735)

| device | Address | Cache address |
|---|---|---|
| 11 | 0 | 1536 |
| | 512 | - |
| | 1024 | - |
| ... | ... | ... |
| 12 | 0 | 2048 |
| | 512 | - |
| | 1024 | - |
| ... | ... | ... |

| LU | LU address | Node ID | Device | Device address |
|---|---|---|---|---|
| 01 | 0 | 0 | 12 | 2 |
| | 1 | 1 | 11 | 5 |
| | 2 | 2 | 11 | 0 |
| ... | ... | ... | ... | ... |
| 02 | 0 | 3 | 11 | 3 |
| | 1 | 0 | 12 | 0 |
| | 2 | 1 | 12 | 1 |
| ... | ... | ... | ... | ... |

METHOD AND APPARATUS FOR DATA CACHE IN CONVERGED SYSTEM

CROSS-REFERENCE TO RELATED APPLICATIONS

This application is a U.S. National Stage entry of PCT Application No. PCT/US2014/065976, filed on Nov. 17, 2014. The contents of the foregoing are incorporated by reference.

BACKGROUND

Field

This example implementations described herein relate generally to computer systems and more particularly, to data caching technologies in converged system that may execute application processing, server processing, and storage processing in the same, shared hardware.

Related Art

Caching technology is known in the related art. Generally, a related art storage system includes a cache memory and data stored in the storage device, such as a hard disk drive, is cached to the cache memory. One related art system includes technology to use a Solid-State-Drive (SSD) installed on a server as a cache for the data stored in a storage system connected to the server.

Generally, related art converged systems include of one or more hardware nodes and storage capacity provided by storage devices associated within each of the nodes forms a resource pool. These resources of the resource pool can be shared across the nodes. Several converged system products are known in the related art. In a related art converged system application, server processing and storage processing are all executed in the same hardware.

In the related art converged system, two address spaces must be managed by a single node when the processing of the server and the processing of the storage is executed on the same hardware node. The first address corresponds to the address of LU (Logical Unit), which is recognized by the server process. This first address is referred to herein as a virtual address space. The second address corresponds to the address of the storage device. This second address is referred to herein as an internal address space.

The Logical Unit (LU) is created from the capacity pool formed by the storage device associated with all of the nodes. As a result, each virtual address space may generally be different from the internal address spaces. If the related art system consists of only one large system (i.e., a single node), caching using the virtual address spaces has the same effect as caching using the local address spaces. However, if the related art system consists of two or more nodes, different effects can occur, depending on whether the virtual address spaces or the local address spaces are used for caching.

For example, when caching is performed using only the internal address spaces in a converged system having more than one node, data access of a storage device in a different node requires communication between nodes, even in cache hit cases, which can cause decreased performance inconsistent latency.

Alternatively, when caching is done using only virtual address space in a converged system having more than one node, an application running on one node can only use the cache area of the same node. For the system, this may result in inefficient allocation of the cache area. In particular, low priority applications may consume the cache area, decreasing the effectiveness of the cache area.

SUMMARY

Aspects of the present application may include a computer device including a node having a storage device having a plurality of first internal address spaces, a cache memory, and a processor may be provided. The processor may provide a virtual volume. The virtual volume may have a plurality of virtual address spaces including first virtual address spaces corresponding to the plurality of first internal address spaces. The processor may cache data of a virtual address space in a first cache space of the cache memory by associating the virtual address space with the first cache space. Further, the processor may cache data of a first internal address space of the first internal address spaces in a second cache space of the cache memory by associating the first internal address space with the second cache space.

Aspects of the present application may also include a method. The method may include providing a virtual volume, the virtual volume having a plurality of virtual address spaces, the plurality of virtual address spaces including first virtual address spaces, which correspond to a plurality of first internal address spaces of a first storage device of a first node. The method may also include caching data of a virtual address space of the virtual address spaces in a first cache space of a first cache memory by associating the virtual address space with the first cache space. The method may further include caching data of the first internal address space of the plurality of first internal address spaces in a second cache space of the first cache memory by associating the first internal address space with the second cache space.

BRIEF DESCRIPTION OF THE DRAWINGS

FIG. 5 is diagram showing an example implementation of a virtual cache mode table.

FIG. 6 is diagram showing an example implementation of an internal cache mode table.

FIG. 7 is a diagram showing an example implementation of a cache management table.

FIG. 9 is a diagram of an example implementation of a data node table.

DETAIL DESCRIPTION

Some example implementations will be described with reference to drawings in the following. The example implementations that are described herein do not restrict the inventive concept, and one or more elements that are described in the example implementations may not be essential for implementing the inventive concept. Further, although certain elements may be referred to in the singular form, elements are not intended to be limited to the singular and may also be implemented with one or more of the same element, depending on the desired implementation.

In the following descriptions, the processing by a "program" may be described in some exampled implementations. In these implementations, the "program" may be executed by a processor, which performs the predetermined processing. Further, in some implementations the processor may also be the subject of the processing. The processing that is disclosed as being performed by a program may also be performed as processing that is executed by a processor, which executes the program or as an apparatus that is provided with the processor (for instance, a control device, a controller, and a storage system). Moreover, a part or a whole of a processing that is executed when the processor executes a program can also be executed by a hardware circuit as substitute for or in addition to a processor.

First Example Implementation

In the first example implementation, methods and/or apparatuses in which virtual address space caching and internal address caching coexist and read and write processing flows thereof are described.

Figure 1:
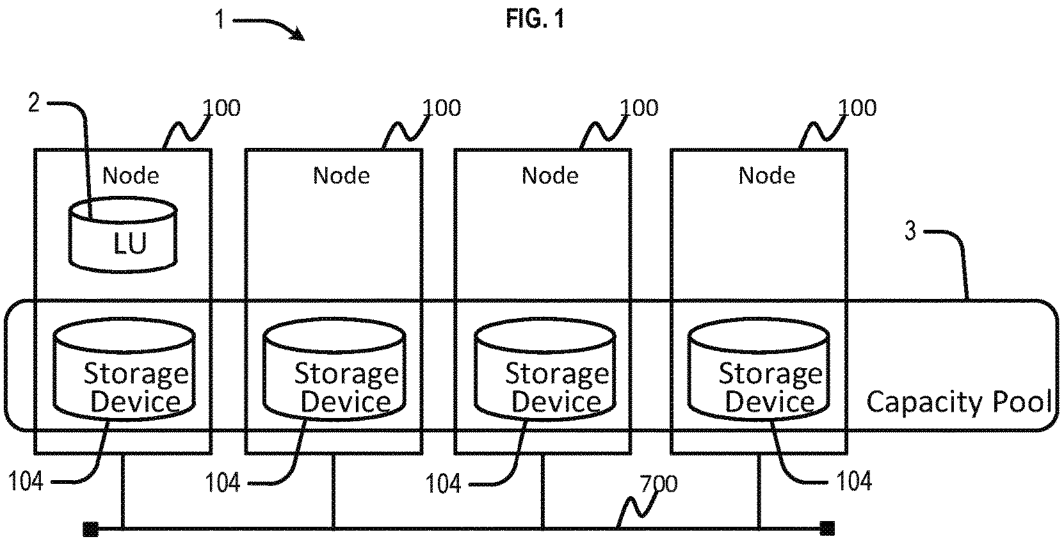
FIG. 1 is a diagram showing a computer system in accordance with a first example implementation of the present application.

FIG. 1 is a diagram showing a computer system 1 in accordance with an example implementation. The computer system 1 may include one or more nodes 100. Each node 100 is physically connected to other nodes 100 by a network 700. Each node may include one or more storage devices 104 and storage devices of the plurality of nodes 100 may collectively form a capacity pool 3. LU (Logical Unit) 2 may be a virtual volume configured to provide the capacity to an application, and may be created by using the capacity pool 3. The data of the LU can be stored in storage devices 104 of one or more nodes 100. The storage devices 104 may be physical storage device, such as a hard disk drive, or other storage devices that may be apparent to a person of ordinary skill in the art. Moreover, a logical device, created from one or more physical devices, may also be considered a storage device 104.

Figure 2:
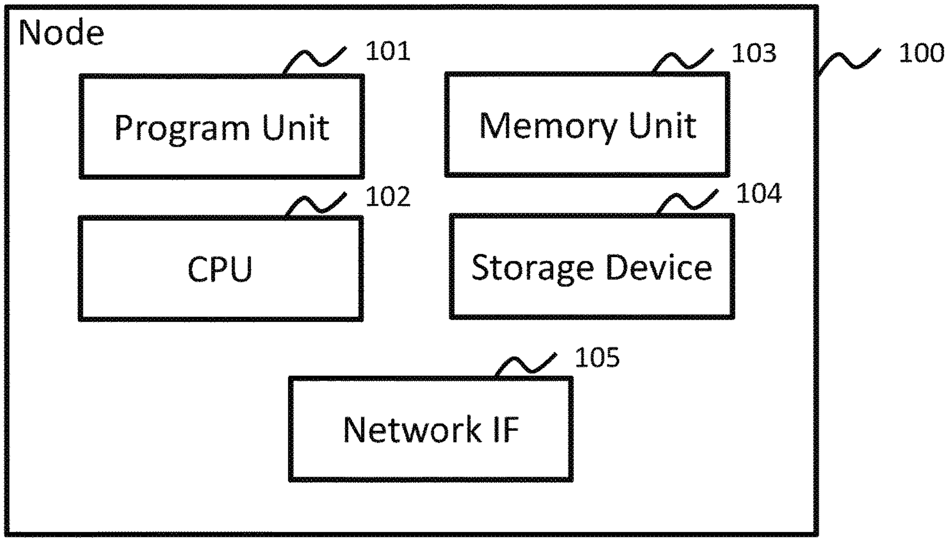
FIG. 2 is a diagram showing details of a node of the computer system illustrated in FIG. 1.

FIG. 2 is a diagram showing details of node. The node 100 includes a program unit 101, a memory unit 103, Central Processing Unit (CPU) 102, storage device 104 and network interface (IF) 105. Each node 100 may have a different amount of the resource. For example, some nodes 100 can have a large number of processors and other nodes can have large amount of storage capacity. And, some nodes 100 may have a combination of SSD (Solid state drives) and HDD (Hard Disk Drives) as storage devices 104.

Figure 3:
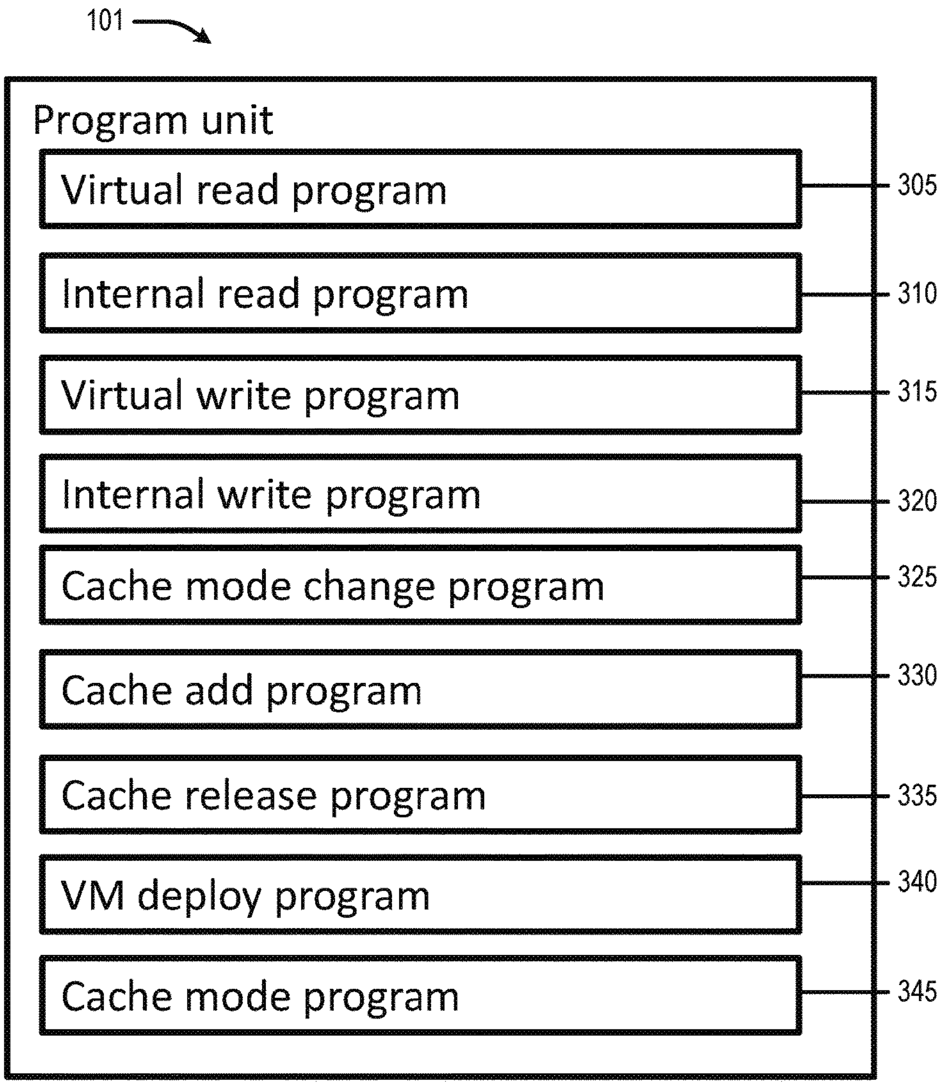
FIG. 3 is a diagram showing an example implementation of a program unit.

FIG. 3 is a diagram showing an example implementation of a program unit 101. The program unit 101 may include a virtual read program 305, internal read program 310, virtual write program 315, internal write program 320, cache mode change program 325, cache add program 330, cache release program 335, VM deploy program 340 and cache mode program 345 stored therein. Details of these programs are described below.

Figure 4:
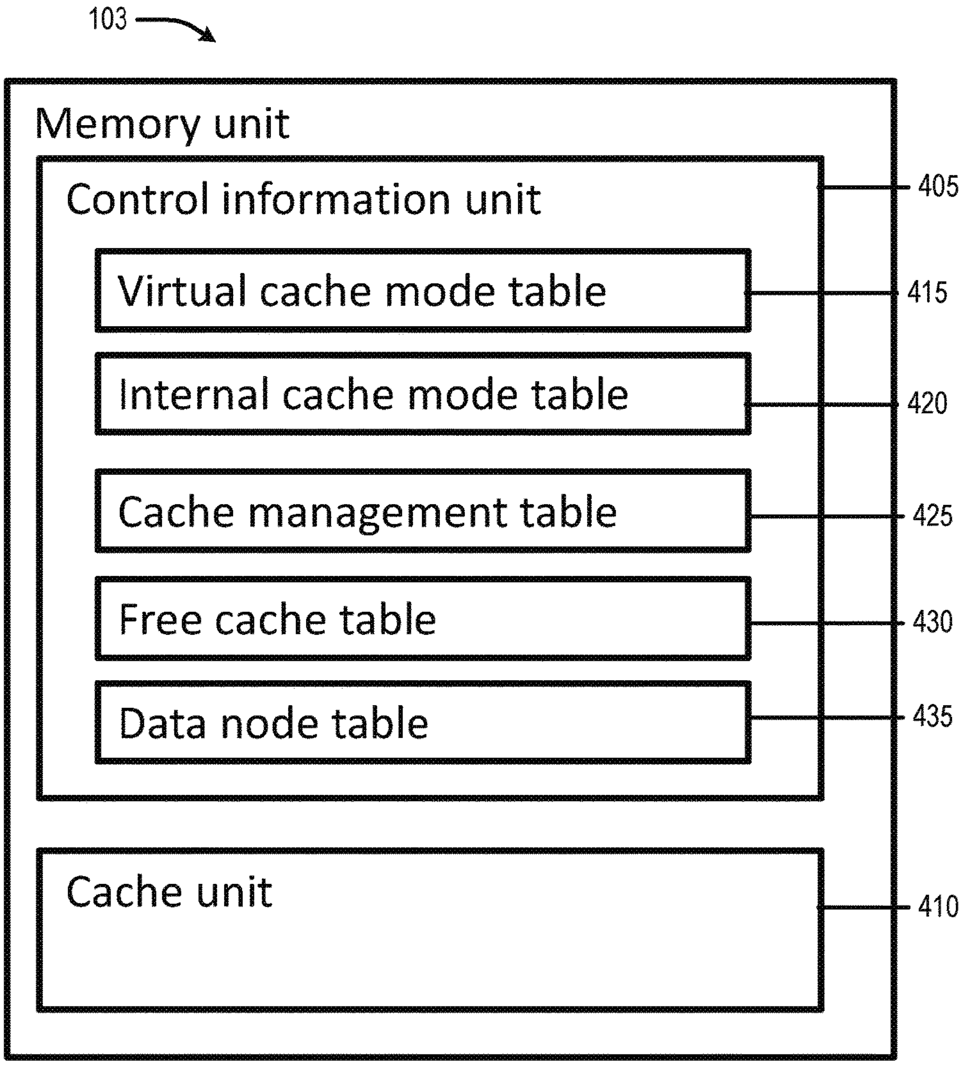
FIG. 4 is a diagram showing an example implementation of a memory unit.

FIG. 4 is a diagram showing an example implementation of a memory unit 103. Memory unit 103 includes a control information unit 405 and cache unit 410. The control information unit 405 may include a virtual cache mode table 415, an internal cache mode table 420, a cache management table 425, a free cache table 430 and a data node table 435. Details of these tables are described below. The cache unit 410 may be used to cache the data which is stored in the storage device for performance boost.

FIG. 5 is diagram showing an example implementation of a virtual cache mode table 415. The virtual cache mode table 415 includes an LU column 505, a cache flag column 510, and a write through column 515, which manage attributes of the virtual cache. The LU column 505 manages identification information that to identifies each LU in the system 1. The cache flag column 510 manages information indicative of whether data caching using virtual address space is enabled or disabled. In the cache flag column 510, an indication of "ON" indicates that data caching is enabled and "OFF" indicates data caching is disabled. The write through column 515 manages information indicative of whether a write through write process mode is enabled. In the write through column 515, an indication of "ON" indicates write through mode is enabled and the write data is written to the internal address layer before a write response is received. Further in the write through column 515, an indication of "OFF" indicates a write back mode is enabled and the write data is written to the internal address layer after write response is received.

FIG. 6 is diagram showing an example implementation of an internal cache mode table 420. The internal cache mode table 420 includes a device column 605 and a cache flag column 610, which manage attributes of the internal cache. The device column 605 manages identification information used to identify the storage volume (i.e., storage devices) in the system 1. The cache flag column 610 manages information indicative of whether data caching using an internal address space is enabled or disabled. In the cache flag column 610, an indication of "ON" indicates data caching is enabled and an indication of "OFF" indicates data caching is disabled.

FIG. 7 is a diagram showing an example implementation of a cache management table 425. The cache management table 425 includes two tables 700, 705. The first table 700 is illustrated on the left side of FIG. 7 and includes an LU column 710, an address column 715 and a cache address column 720, which manage attributes of the cache. For example, the data stored at address "0" within LU "01" is cached at cache address "512". The second table 705 is illustrated on the right side of the FIG. 7 and includes a device column 725, an address column 730 and a cache address column 735, which manage attributes of the cache.

For example, the data stored at the address "0" in storage device "11" is cached at cache address "1536".

In this example implementation, the cache management data is structured as a table. However, example implementations are not limited to this data structure, and other data structures such as a tree structure may be used for cache management. Additionally, cache data status, such as "dirty data" or "clean data" can also be managed using similar data structures. As used herein, "dirty data" indicates that the data in the cache is newer than data in the storage device. Thus, destage processing, which writes the newer data from the cache to the storage device, may be executed. Further, "clean data" indicates that the data in the cache and data in the storage device is the same age. Thus, the cache area storing clean data can be released without destaging processing because it has already been stored to the storage device.

Figure 8:
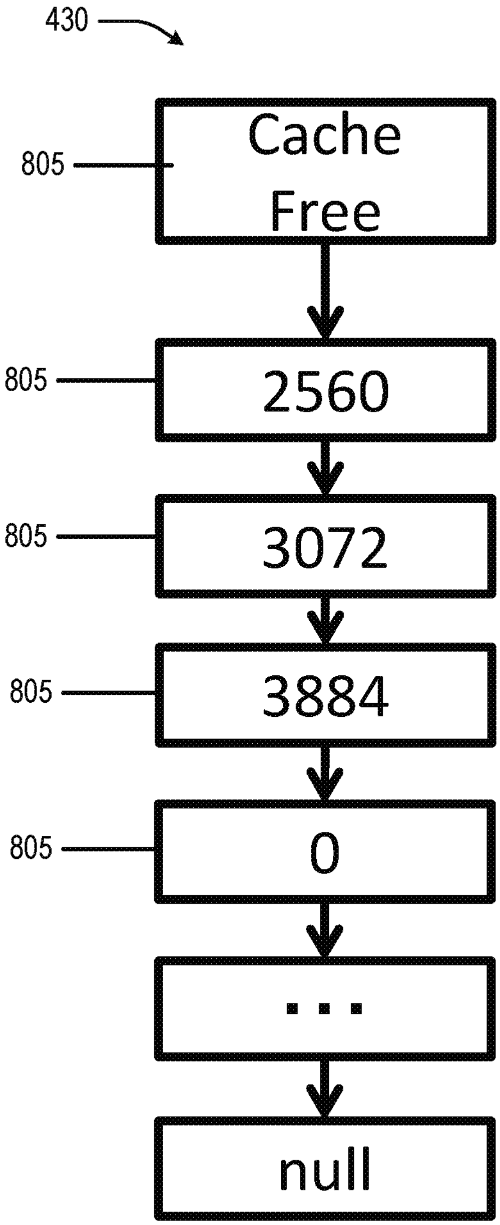
FIG. 8 is diagram of an example implementation of a free cache table.

FIG. 8 is a diagram of an example implementation of a free cache table 430. The free cache table 430 manages free segments 805 of cache space of the cache memory. In this example implementation, queue data structure is illustrated. As illustrated, the "Cache free" segment 805 is at the head of the queue. In this example, cache address segments 805, shown as "2560", "3072", etc. are all free.

FIG. 9 is a diagram of an example implementation of a data node table 435. The data node table 435 manages the location of data within the system 1. The data node table 435 includes an LU column 905, an LU address column 910, a node ID column 915, a device column 920 and a device address column 925, which manage attributes of the correlation between LU addresses (i.e. virtual address space) and device addresses (i.e. internal address space). The Node ID column 915 provides an identification to uniquely identify the node within the converged system. For example, the LU address (i.e. virtual address space) "0" of LU "01" corresponds to the device address (i.e. internal address space) "2" of device "12" of Node "0". Thus, data written to the LU address "0" of LU "01" is stored internally in the device address "2" of device "12" of Node "0".

Figure 10:
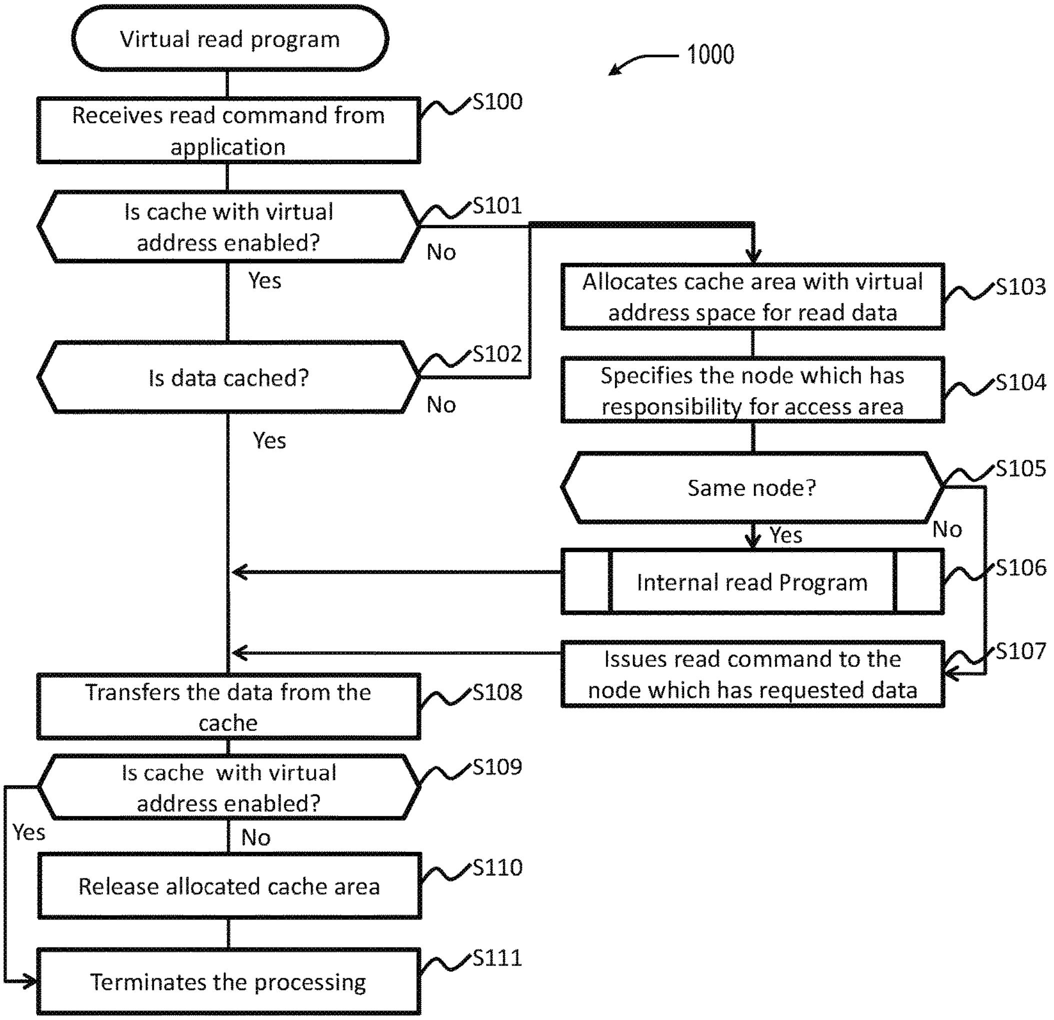
FIG. 10 is flow diagram of processing by an example implementation of a virtual read program.

FIG. 10 is flow diagram of processing by an example implementation of a virtual read program 1000. At S100, the virtual read program 1000 receives a read command from an application running on the system 1. In response to receiving the read command, the virtual read program 1000 checks whether caching with virtual address space is enabled at S101. If caching with virtual address space is disabled (i.e. a result "No" at S101), the virtual read program 1000 proceeds to S103 as discussed in greater detail below.

Conversely, if caching with virtual address space is enabled (i.e. a result "Yes" at S101), the virtual read program 1000 proceeds to S102 and determines whether read target data has been cached with virtual address space. If data has been cached (i.e. a result "Yes" at S102), the virtual read program 1000 skips step S103 to S107 and proceeds to S108 discussed in greater detail below. Conversely, if data has not been cached (i.e. a result "No" at S102), the virtual read program 1000 progresses to S103 as discussed in greater detail below.

In S103, the virtual read program 1000 allocates the cache area to store read data. By executing this step, the cache management table 425 (illustrated as the table 700 on the left side of FIG. 7) is updated based on the allocation of cache area. After the allocation of cache area, the virtual read program 1000 specifies the node where the read target data is stored at S104. This specification indicates that the virtual read program 1000 identifies the node, which has responsibility or ownership of the target data at S104 based on the data node table 435 illustrated in FIG. 9.

The virtual read program 1000 then checks whether the specified node is the same node as the node which is running the virtual read program 1000 at S105. If the specified node in S104 is the same node running the virtual read program 1000 (i.e. a result "yes" in S105), the virtual read program 1000 calls an internal read program 1100 (discussed in greater detail below with respect to FIG. 11) at S106. Conversely, if the specified node in S104 is a different from the node running the virtual read program 1000 (i.e. a result "no" in S105), the virtual read program 1000 issues a read command to the specified node to execute the internal read program 1100 (discussed in greater detail below with respect to FIG. 11) within the specified node at S107.

After completion of either S106 or S107, the virtual read program 1000 transfers the read data, which has been stored to the allocated the cache, to the requesting application at S108. The data was stored to the allocated cache by execution of the internal read program 1100 at either S106 or S107. Then, the virtual read program 1000 checks whether caching with virtual address space is enabled, based on the virtual cache mode table 415 (illustrated in FIG. 5) at S109. If caching with virtual address space is enabled (i.e. a result "yes" in S109), the virtual read program 1000 progresses to S111 and terminates processing. Conversely, if caching with virtual address space is disabled (i.e. a result "no" in S109), the virtual read program 1000 releases the allocated cache area at S110 and terminates processing at S111.

Figure 11:
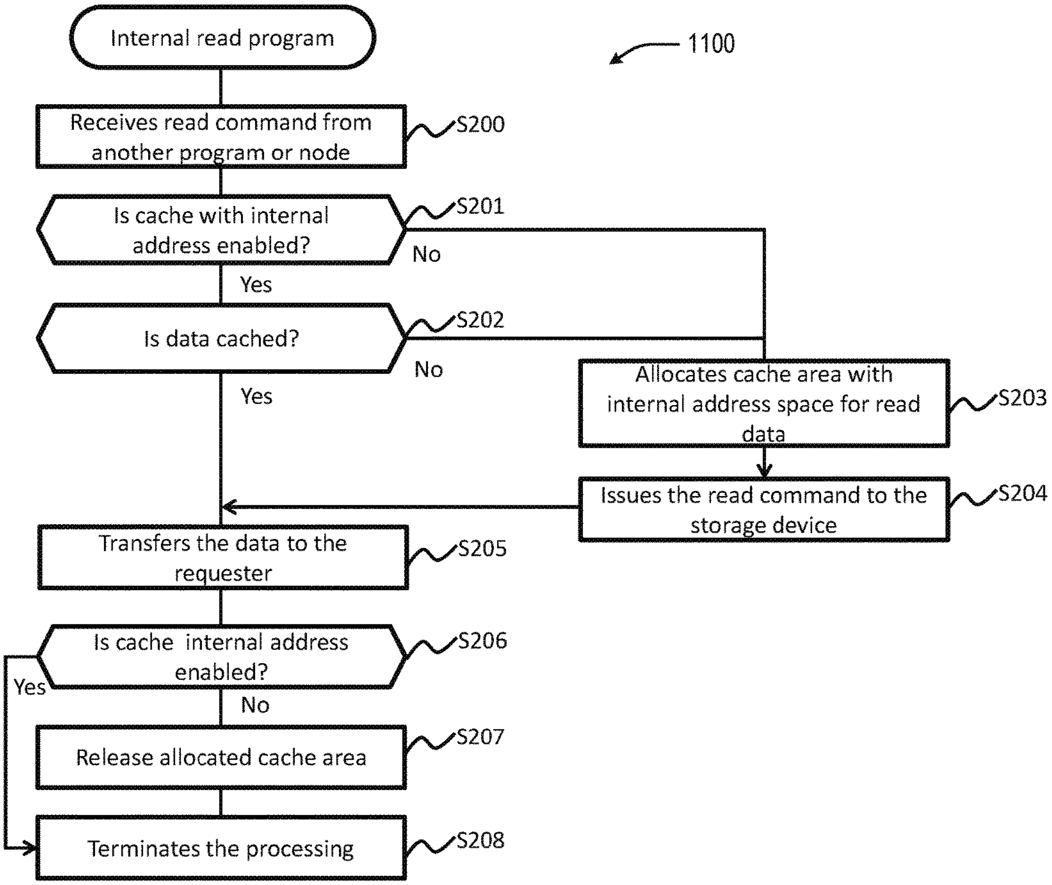
FIG. 11 is a flow diagram of processing by an example implementation of an internal read program.

FIG. 11 is a flow diagram of processing by an example implementation of an internal read program 1100. The internal read program 1100 is called and executed during either S106 or S107 of the processing of the virtual read program 1000 illustrated in FIG. 10. The internal read program 1100 is called by the virtual read program 1000 in S106 when the node having responsibility for the target read data is the same node that is running the virtual read program 1000. Conversely, internal read program 1100 is called by a different node in response to a read command issued by the virtual read program 1000 when the different node has responsibility for the target read data, but is different from the node that is running the virtual read program 1000.

In S200, the internal read program 1100 receives a read command from the virtual read program 1000, or another program or another node having responsibility for the target read data at S200. Then, the internal read program 1100 checks whether caching with internal address space is enabled at S201. If caching with internal address space is disabled (i.e. a result "no" at S201), the internal read program 1100 proceeds to S203 discussed in greater detail below.

Otherwise, if caching with internal address space is enabled (i.e. a result "yes" at S201), the internal read program 1100 determines whether read target data has been cached with internal address space at S202. If data has been cached (i.e. a result "yes" at S202), the internal read program 1100 skips step S203 and S204 and progresses to the step S205 (also discussed in greater detail below). Conversely, if data has not been cached (i.e. a result "no" at S202), the internal read program 1100 progresses to S203 (discussed in greater detail below).

In S203, the internal read program 1100 allocates the cache area with internal address space to store read data. By executing this step, the cache management table 425 (illustrated at the table 705 on the right side of FIG. 7) is updated based on the allocation of cache area. After the allocation of cache area, the internal read program 1100 issues a read command to the physical storage device and transfers the read target data from the physical storage device to the allocated cache at S204.

At S205, the internal read program 1100 transfers the read data from the allocated cache to the requester. The virtual read program 1000, or another node or another program may be the requester. The internal read program 1100 then checks whether caching with internal address space is enabled at (S206). If caching with internal address space is enabled (i.e. a result "yes" at S206), the internal read program terminates processing at S208. Conversely, If caching with internal address space is disabled (i.e. a result "no" at S206), the internal read program 1100 releases the allocated cache area at S207) and terminates processing at S208.

By using the virtual read and internal read programs 1000, 1100 mentioned above, read data caching using ether internal address space or virtual address space or both can be realized in read processing. Write processing will now be described below.

Figure 12:
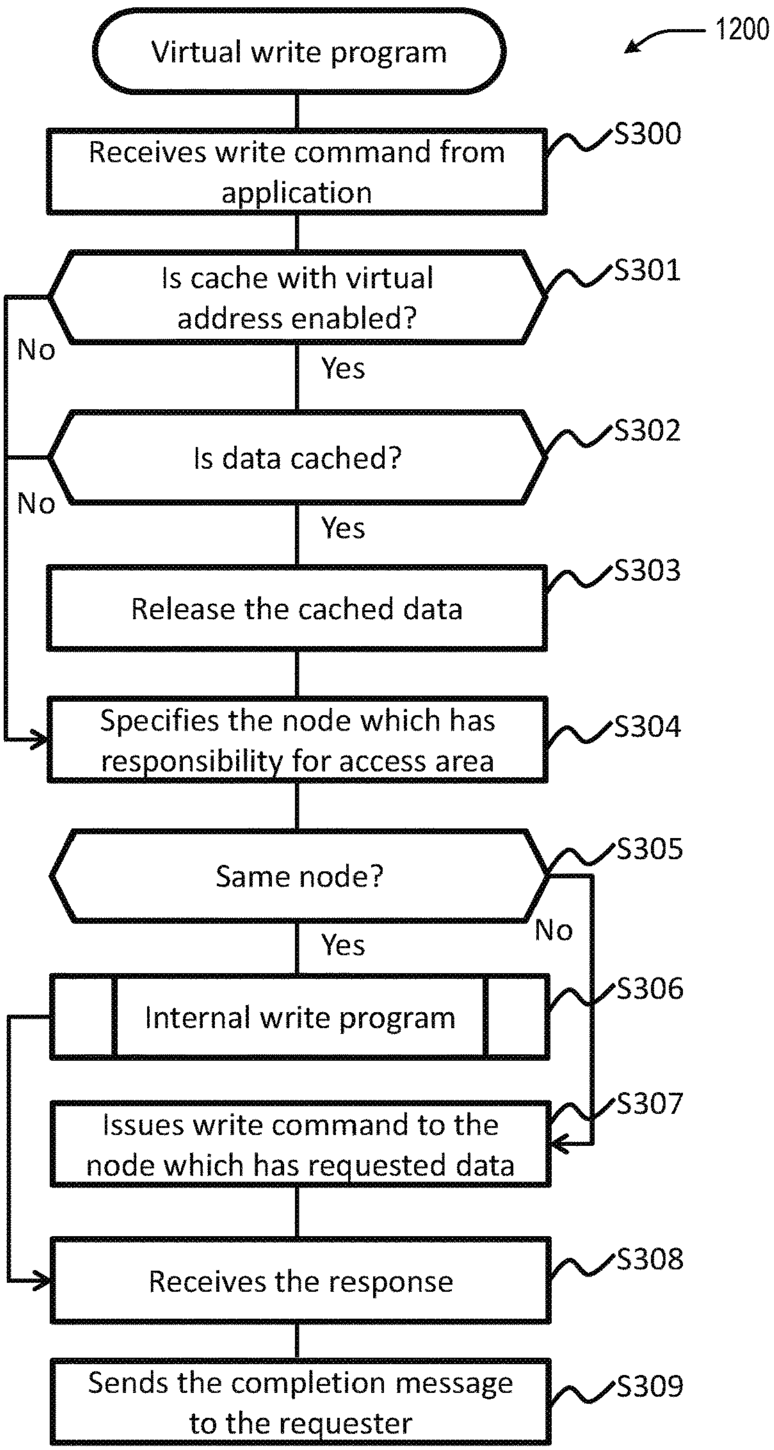
FIG. 12 is a flow diagram of processing by an example implementation of a virtual write program.

FIG. 12 is a flow diagram of processing by an example implementation of a virtual write program 1200. In this implementation, a write through write process is performed. This indicates that the write data is not cached with virtual address space. If the written data is cached by only one node, reliability of the data may be low and the data may be lost. In S300, the virtual write program 1200 receives a write command from an application running on the system 1. In response to receiving the write command, the virtual write program 1200 checks whether caching with virtual address space is enabled at S301 based on the virtual cache mode table 415 of FIG. 5. If caching with virtual address space is disabled (i.e. a result "no" at S301), the virtual write program 1200 proceeds to S304 (discussed in greater detail below).

Conversely, if caching with virtual address space (i.e. a result "yes" at S301), the virtual write program 1200 checks whether data has been cached with virtual address space at S302. If data has not been cached (i.e. a result "no" at S302), the virtual write program 1200 skips S303 and progresses to S304. Conversely, if data has been cached (i.e. a result "yes" at S302), the virtual write program 1200 releases the cached data at S303. In this example, the write data is not cached with virtual address space. Thus, any data currently in the cache was cached during read processing. Since the cached data would be clean data, the cached data can be released.

After S301, S302 or S303, the virtual write program 1200 specifies the node which stores the write target data at S304. This specification indicates that the virtual write program 1200 identifies the node, which has responsibility or ownership of the target data at S304 based on the data node table 435 illustrated in FIG. 9.

The virtual write program 1200 then checks whether the specified node is the same as the node which is running the virtual write program 1200 at S305. If the specified node in S304 is the same node running the virtual write program 1200 (i.e. a result "yes" in S305), the virtual write program 1200 calls an internal write program 1300 (discussed in greater detail below with respect to FIG. 13) at S306. Conversely, if the specified node in S304 is different from the node running the virtual write program 1200 (i.e. a result "no" in S305), the virtual write program 1200 issues a write command to the specified node to executes the internal write program 1300 (discussed in greater detail below with respect to FIG. 13) within the specified node at S307. After completion of S306 or S307, the virtual write program 1200 receives a response from the internal write program 1300, or the other node specified in S304, at S308 and sends a completion message to the requester at S309.

Figure 13:
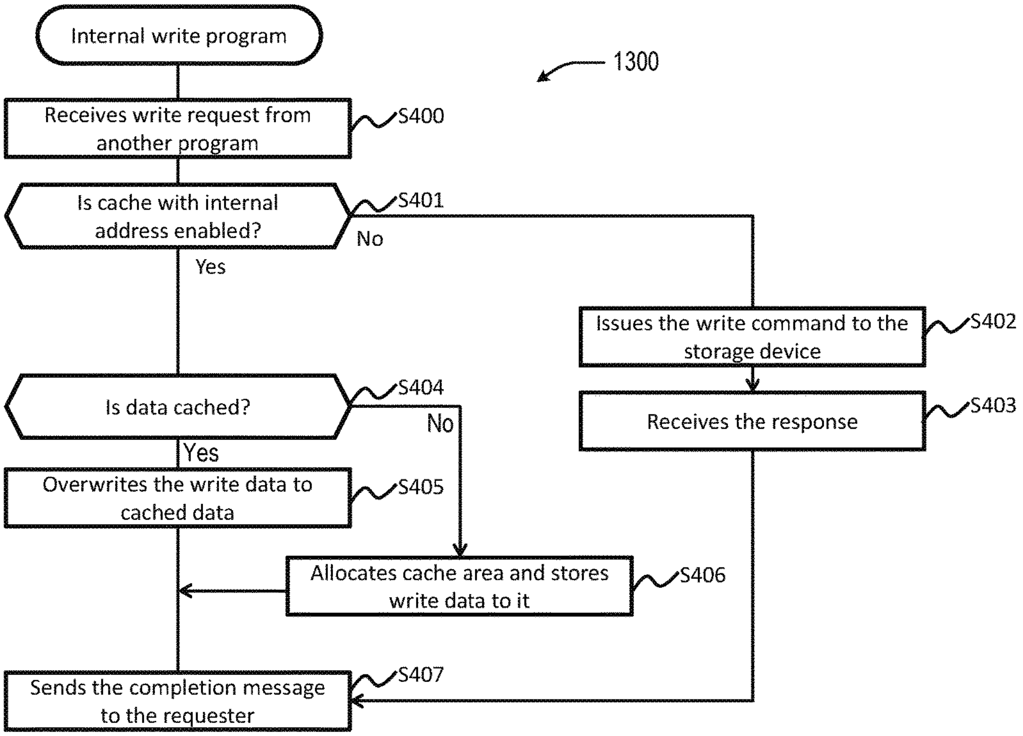
FIG. 13 is a flow diagram of processing by an example implementation of an internal write program.

FIG. 13 is a flow diagram of processing by an example implementation of an internal write program 1300. The internal write program 1300 is called and executed during either S306 or S307 of the processing of the virtual write program 1300. The internal write program 1300 is called by the virtual write program 1200 in S306 when the node having responsibility for the target write data is the same node that is running the virtual write program 1200. Conversely, the internal write program 1300 is called by a different node in response to a write command issued by the virtual write program 1200 when the different node has responsibility for the target write data, but is different from the node that is running the virtual write program 1200.

In S400, the internal write program receives a write command from the virtual write program 1200, or another program or another node having responsibility for the target write data. Then, the internal write program 1300 checks whether caching with internal address space is enabled at S401. If caching with internal address space is disabled (i.e. a result "no" at S401), the internal write program 1300 proceeds to S402 (discussed in greater detail below). Conversely, if caching with internal address space is enabled (i.e. the result "yes" at S402), the internal write program 1300 proceeds to S404 discussed in greater detail below.

At S402, the internal write program 1300 issues a write command to the physical storage device and receives a response at S403. After S403, the internal write program 1300 sends a completion message to the requester at S407. In the write processing in S402, write data may be stored using data protection methods, such as RAID (Redundancy Arrays Independent Disks), mirroring, triplication.

At S404, the internal write program 1300 determines whether data has been cached with internal address space. If data has been cached with internal address space (i.e. a result "yes" at S404), the internal write program 1300 overwrites the write data to the cached data at S405 and sends a completion message to the requester at S407.

Conversely, if data has not been cached with internal address space (i.e. a result "no" at S404), the internal write program 1300 allocates cache area and stores write data to the allocated cache area at S406. Further, the internal write program 1300 then sends a completion message to the requester at S407.

Figure 14A:
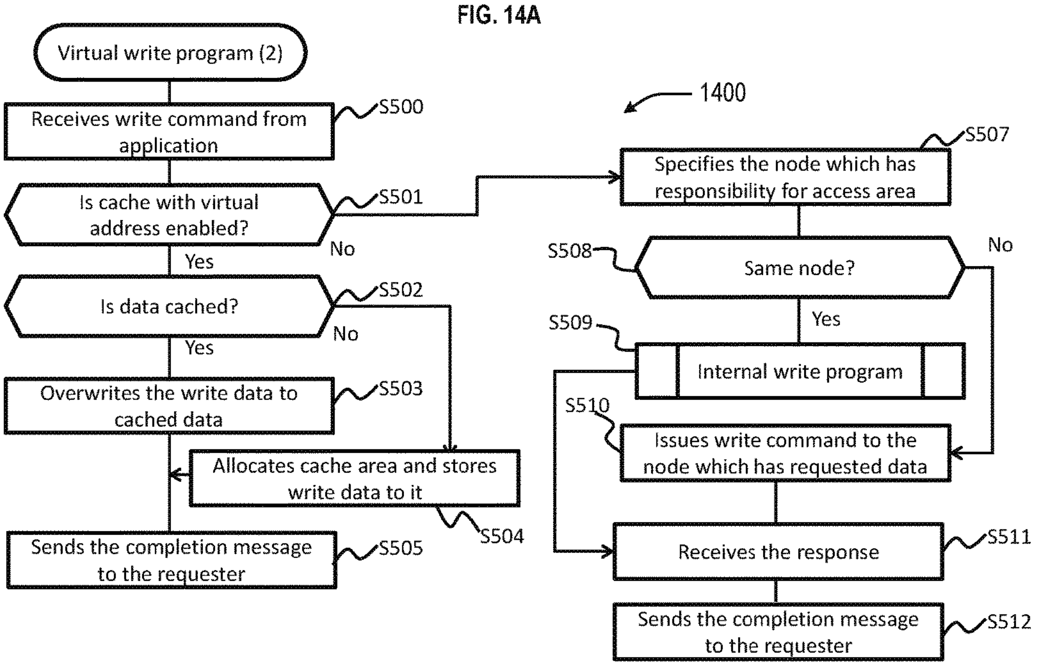
FIG. 14A is a flow diagram of processing by another example implementation of a virtual write program.

FIG. 14A is a flow diagram of processing by another example implementation of a virtual write program 1400. In this example implementation, the virtual write program 1400 caches the write data with virtual address space (i.e. the virtual write program uses write back). The virtual write program 1200 of FIG. 12 or the virtual program 1400 of FIG. 14A can be chosen based on the write through information in column 515 of the virtual cache mode table 415 of FIG. 5. If the value of the write through column 515 is "ON", the virtual write program 1200 of FIG. 12 is executed. Otherwise, if the value of the write through column 515 is "NO", the virtual write program 1400 of FIG. 14A is executed.

In S500, the virtual write program 1400 first receives a write command from an application running on the system 1. Then, the virtual write program 1400 checks whether caching with virtual address space is enabled at S501 based on the virtual cache mode table 415 of FIG. 5. If caching with virtual address space is disabled (i.e. a result "no" at S501), the virtual write program 1400 proceeds to the step S507 (discussed in greater detail below). Conversely, if caching with virtual address space is enabled (i.e. a result "yes) at S501), the virtual write program 1400 checks whether data has been cached with virtual address space at S502. If data has not been cached with virtual address space (i.e. a result "no" at S502), the virtual write program 1400 program allocates cache area and stores write data to the allocated cache area at S504 and sends a completion message to the requester at S505. Conversely, if data has been cached with virtual address space (i.e. a result "yes" at S502), the virtual write program 1400 overwrites the write data to the cached data at S503. Finally, the virtual write program 1400 sends the completion message to the requester at S505.

Returning to S501, if caching with virtual address space is disabled (i.e. a result "no" at S501), the virtual write program 1400 proceeds to the step S507 (discussed in greater detail below). Beginning with step S507, the virtual write program 1400 executes a process similar to the process executed by the virtual write program 1200 at S304 to S309 in FIG. 12. Specifically, the virtual write program 1400 specifies the node which stores the write target data at S507. This specification indicates that the virtual write program 1400 identifies the node, which has responsibility or ownership of the target data at S507 based on the data node table 435 illustrated in FIG. 9.

The virtual write program 1400 then checks whether the specified node is the same as the node which is running the virtual write program 1400 at S508. If the specified node in S507 is the same node running the virtual write program 1400 (i.e. a result "yes" in S508), the virtual write program 1400 calls the internal write program 1300 (discussed above with respect to FIG. 13) at S509. Conversely, if the specified node in S507 is different from the node running the virtual write program 1400 (i.e. a result "no" in S508), the virtual write program 1400 issues a write command to the specified node to execute the internal write program 1300 (discussed in detail above with respect to FIG. 13) within the specified node at S510. After completion of S509 or S510, the virtual write program 1400 receives a response from the internal write program 1300, or from the other node specified in S507, at S511 and sends a completion message to the requester at S512.

In the example implementation of FIG. 14, the write data is written in only one node. However, in other example implementations, write data could be stored to cache areas of two or more nodes as discussed in greater detail below.

Figure 14B:
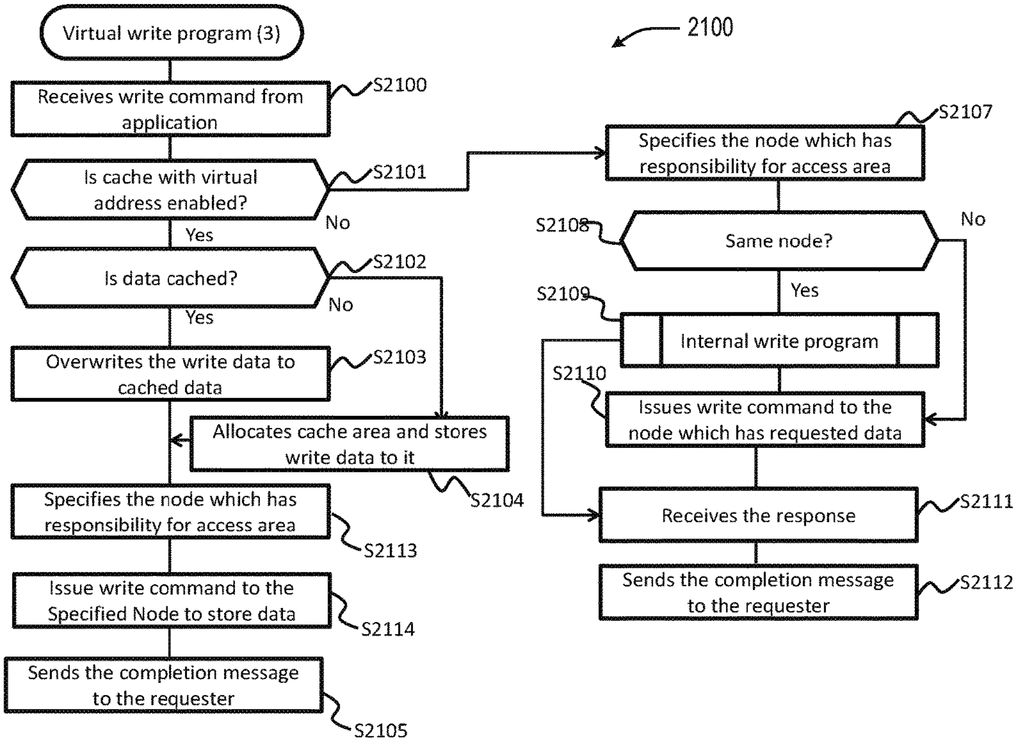
FIG. 14B is a flow diagram of processing of another example implementation of a virtual write program.

FIG. 14B is a flow diagram of processing of another example implementation of a virtual write program 2100. In this example implementation, the virtual write program 2100 stores write data to cache areas of two nodes. The processing of the virtual write program 2100 is substantially similar to the processing of the virtual write program 1400 of FIG. 14, with S2100-S2112 of FIG. 14B being analogous to S500-S512 discussed above. Therefore, redundant description has been omitted.

Figure 14C:
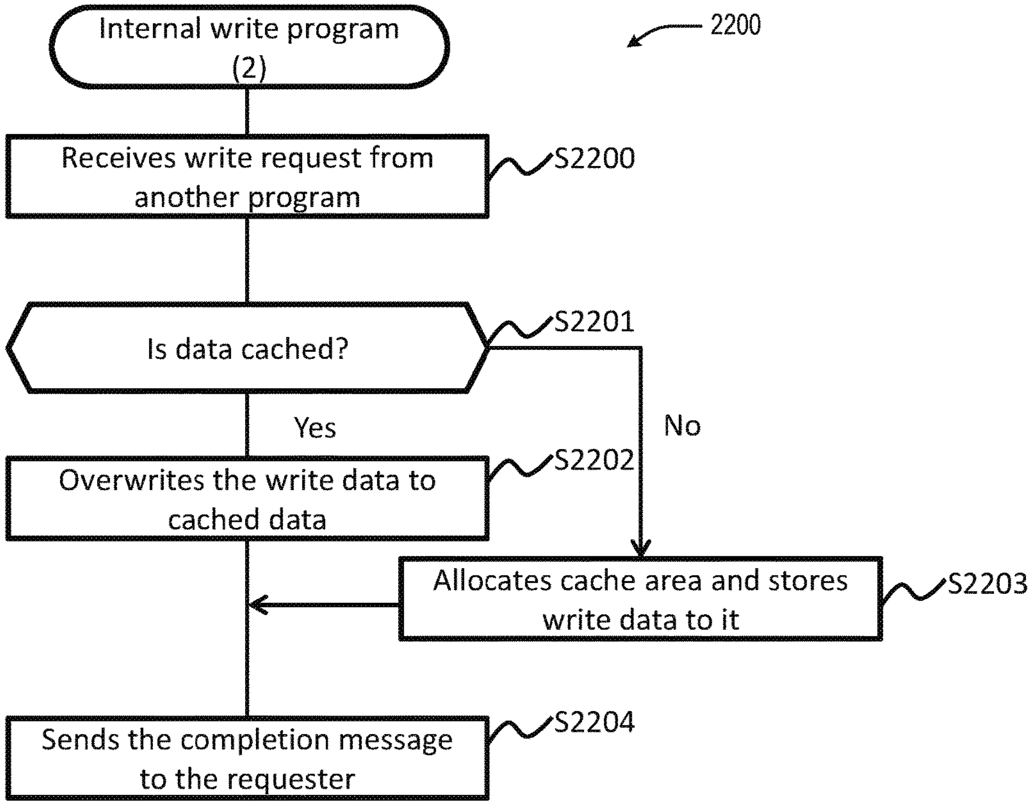
FIG. 14C is a flow diagram of processing of another example implementation of an internal write program.

As illustrated, virtual write program 2100 includes S2113 and 2113 prior to S2105, which is analogous to S505 of FIG. 14. Specifically, after the write data is over written to the cached data in S2103, or the write data is stored to the allocated cache area in 2104, the virtual write program 2100 specifies the node which stores target data in S2113. This specification indicates that the node has responsibility or ownership of the target data. If the responsible node is the same as the node which is running the virtual write program 2100, a different node can be chosen or specified in S2113. The virtual write program 2100 issues a write command to the specified node (i.e. the node having responsibility or ownership of the target write data, or a different node selected) to store the write data in the cache of the specified node in S2114. The write process of the specified node is discussed in greater detail below with respect to FIG. 14C. Once the write command is issued in S2114, the virtual write program 2100 sends a completion message to the requester at S2105.

FIG. 14C is a flow diagram of processing of another example implementation of an internal write program 2200. The internal write program 2200 is called and executed in the specified node to which a write command was sent in S2114 of the virtual write program 2100 of FIG. 14B.

In S2200, the internal write program 2200 receives a write command from another program or another node having responsibility for the target write data in response to write command was sent in S2114 of the virtual write program 2100 of FIG. 14B.

In response to the write command, the internal write program 2200 determines whether data has been cached with internal address space at 2201. If data has been cached with internal address space (i.e. a result "yes" at S2201), the internal write program 2200 overwrites the write data to the cached data at S2202 and sends a completion message to the requester at S2204.

Conversely, if data has not been cached with internal address space (i.e. a result "no" at S2201), the internal write program 2200 allocates cache area and stores write data to the allocated cache area at S2203. Further, the internal write program 2200 then sends a completion message to the requester at S2204.

Through the processing of the virtual write program 2100 of FIG. 14B and the internal write program 2200 of FIG. 14C, the write data is cached (mirrored) with internal address space in another node. In other words, the write data is stored in the cached areas of two different nodes.

In these example implementations, internal address space is used for caching in the second, different node. However, implementations of the present application are not limited to this configuration. For example, caching (mirrored) with the virtual address space can also be used.

If the virtual address space is used during the mirroring, the processing of the internal read program 1100 of FIG. 11 may be modified to include checking whether data has been cached with virtual address space prior to determining whether caching with internal address is enabled in S201. If the data has been cached with the virtual address space, the modified internal read program would proceed to S205, skipping S201-S204. If the data has not been cached with the virtual address space, the modified internal read program would proceed to S201.

A process for changing a cache mode is described below.

Figure 15:
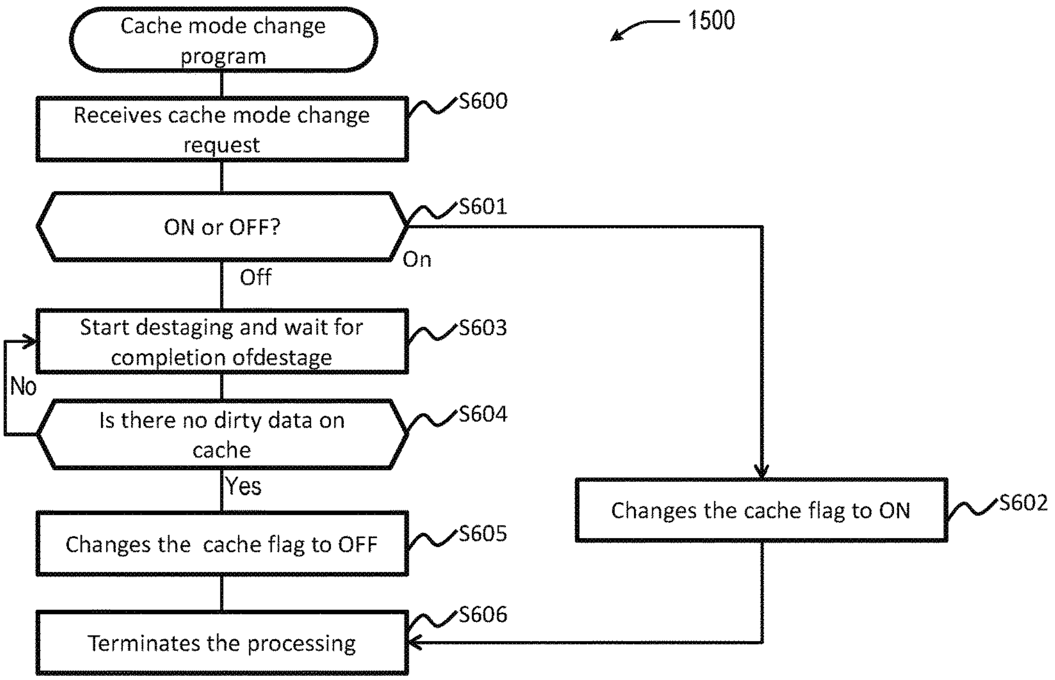
FIG. 15 is a flow diagram of processing by another example implementation of a cache mode change program.

FIG. 15 is a flow diagram of processing by another example implementation of a cache mode change program 1500. The cache mode change program 1500 receives a cache mode change request from a user at S600. The cache mode change request may be received via a management console, or other request receiving mechanism that may be apparent to a person of ordinary skill in the art. The cache mode change program 1500 then checks whether the request is a request to turn ON a cache mode or turn OFF a cache mode at S601.

If the request is to turn ON a cache mode, the cache mode change program 1500 changes the cache flag to "ON" at S602 and an address space may be specified by the user. The cache mode change program 1500 then updates the virtual cache mode table 415 (of FIG. 5) or the internal cache mode table 420 (of FIG. 6) based on the specification in the cache mode change request.

If the request is to turn OFF, the cache mode change program initiates a destaging operation of the dirty cache data and waits for the destaging process to be completed at S603. After the destaging process initiated in S603 has been completed, the cache mode change program 1500 checks whether there is no dirty data on cache with the specified cache address space and the specified cache layer from the request. The specified cache layer is the LU 2 or the storage device 104. If the result of S604 is "no", the cache mode change program 1500 returns to S603. This indicates that new write data has been issued and will become new dirty data during the destaging process. Conversely, if the result of S604 is "yes", the cache mode change program 1500 changes the cache flag to "OFF" in S605. The cache mode change program 1500 then updates the virtual cache mode table 415 (of FIG. 5) or the internal cache mode table 420 (of FIG. 6) based on the specification in the cache mode change request. Finally, the cache mode change program 1500 terminates processing in S606.

Second Example Implementation

In the example implementations discussed above, the physical cache area is shared by a cache with virtual address space and a cache with internal address space. In a shared cache, the caching of one application may be affected by behavior of another application. In the following example implementations, a method to partition physical cache area by virtual address space and internal address space is described.

Figure 16:
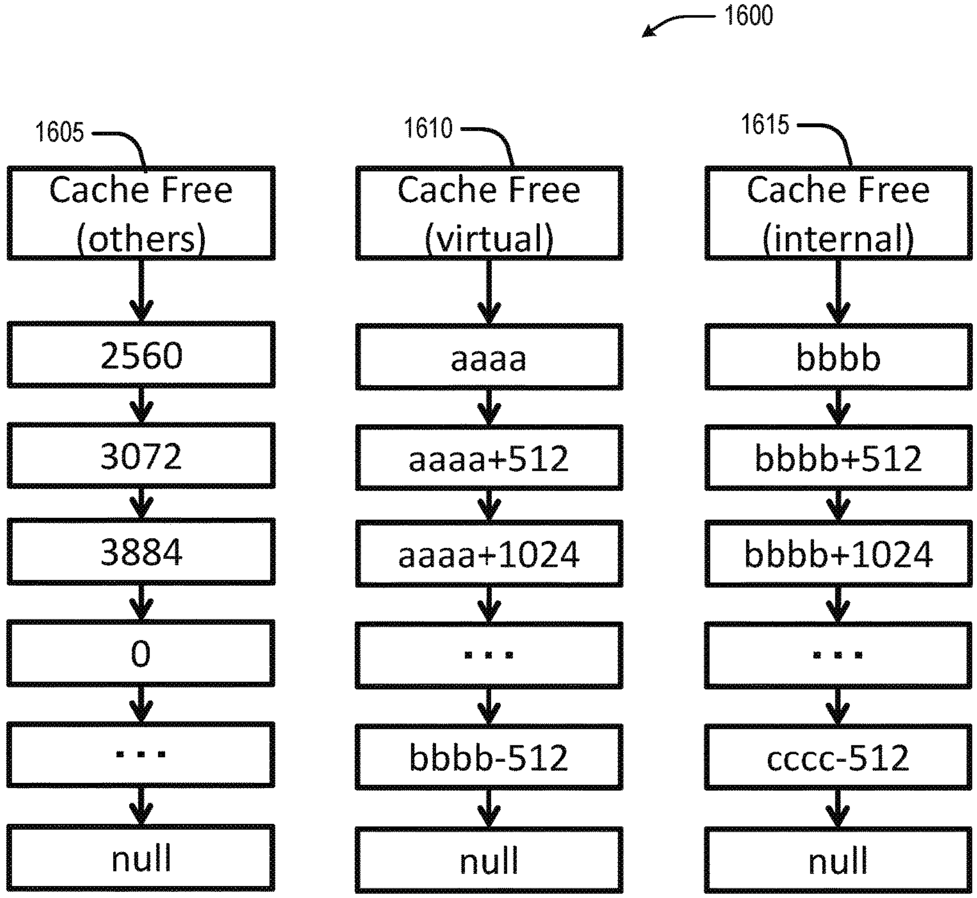
FIG. 16 is a diagram of free queue partitioned into multiple free queues.

To realize cache partitioning, a free queue, such as that illustrated in the free cache table 430 of FIG. 8, may be divided into multiple free queues. FIG. 16 is a diagram of a free queue 1600 partitioned into multiple free queues. More specifically, FIG. 16 illustrates a free queue 1600 partitioned into three types of free queues. Cache free queue (virtual) 1610 is a free queue used for caching with virtual address space. Cache free queue (internal) 1615 is a free queue used for caching with internal address space. Cache free queue (others) 1605 is a free queue that manages free segments which don't belong to either the cache free queue (virtual) 1610 or the cache free queue (internal) 1615. To increase the capacity of cache of the cache free queue (virtual) 1610 or the cache free (internal) 1615, free segments are moved from cache free queue (others) 1605 to either the cache free queue (virtual) 1610 or the cache free queue (internal) 1615.

Figure 17:
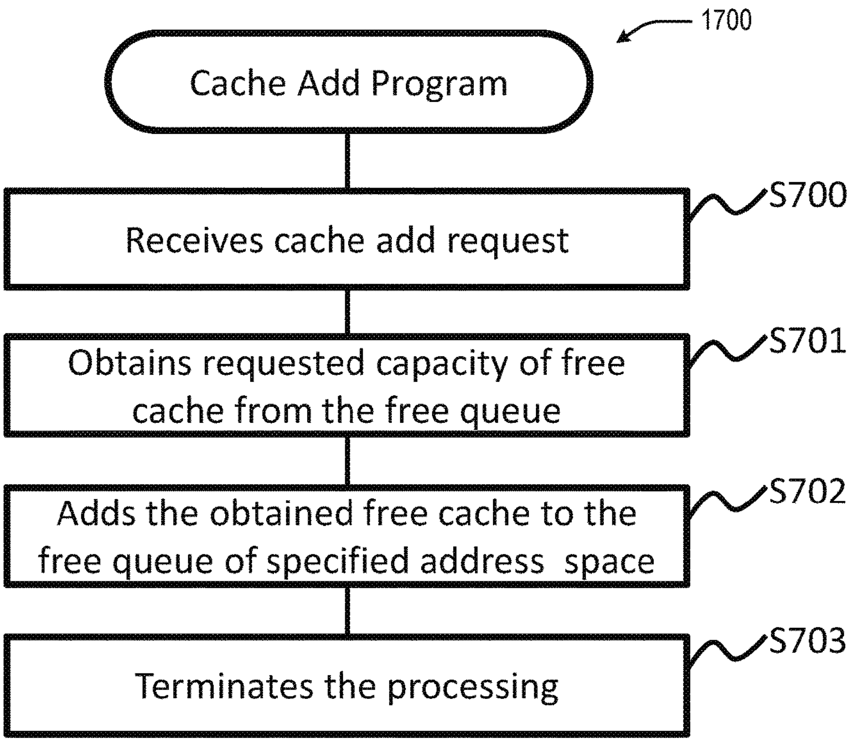
FIG. 17 is a flow diagram of processing by an example implementation of a cache add program.

FIG. 17 is a flow diagram of processing by an example implementation of a cache add program 1700 to increase the cache capacity of either the virtual address space or the internal address space. At S700, the cache add program 1700 receives a cache add request from a user. The cache add request may be received via a management console, or other request receiving mechanism that may be apparent to a person of ordinary skill in the art. The cache add program 1700 then obtains requested capacity of free cache segments from the cache free queue (others) 1605 at S701. If there are not enough available free cache segments for the requested capacity of free cache segments in the cache free queue (others) 1605, the cache add program 1700 may report an error and terminates the processing. After completion of S701, the cache add program 1700 adds the obtained free cache segments to the free queue of specified address space (i.e. either the virtual address space or the internal address space, depending on the received request) at S702. Finally, the cache add program 1700 terminates the processing at S703.

Figure 18:
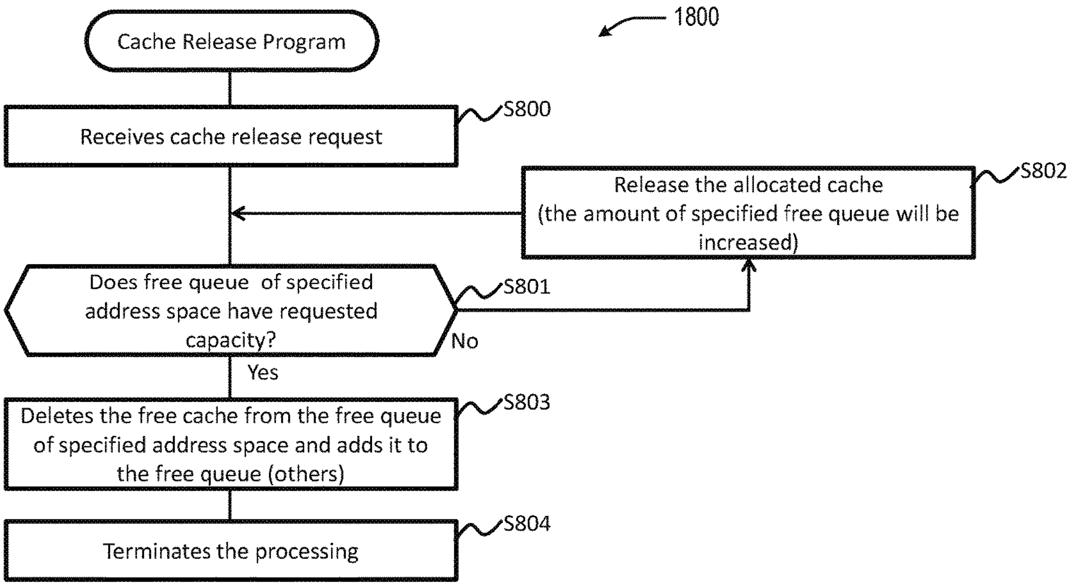
FIG. 18 is a flow diagram of processing by an example implementation of a cache release program.

FIG. 18 is a flow diagram of processing by an example implementation of a cache release program 1800 to decrease the cache capacity of virtual address space or internal address space. The cache release program 1800 receives a cache release request from a user at S800. The cache release request may be received via a management console, or other request receiving mechanism that may be apparent to a person of ordinary skill in the art. The cache release program 1800 then checks whether the free queue of the specified address space (i.e. either the virtual address space or the internal address space, depending on the received request) has the requested capacity at S801. If the free queue of the specified address space has the requested capacity (i.e. a result "yes" at S801), the cache release program 1800 deletes the free cache segments from the free queue of the specified address space and adds the free cache segments to the free queue (others) 1605 at S803. The cache release program 1800 then terminates processing at S804.

Conversely, if the free queue of the specified address space (i.e. either the virtual address space or the internal address space, depending on the received request) does not have the requested capacity (i.e. a result "no" at S801), the cache release program 1800 releases the allocated cache of the specified address space (i.e. either the virtual address space or the internal address space, depending on the received request) at S802. This release of the allocated cache is performed by accessing the cache management table 425 of FIG. 7. If the allocated cache is storing dirty data, a destaging process may be performed to store the dirty data to the physical storage device 104. Once all dirty data has been stored to the physical storage device 104, the allocated cache storing clean data can be released to the cache free queue of the specified address space in S802. To avoid a destaging process, release of cache storing clean data may be prioritized over release of cache storing dirty data in some implementations. After completion of S802, the cache release program 1800 returns to S801 and executes S801-S804 using the released allocated cache.

A method to determine the cache address space automatically may be described. For example, when a virtual machine is deployed, the cache address space can be automatically determined.

Figure 19:
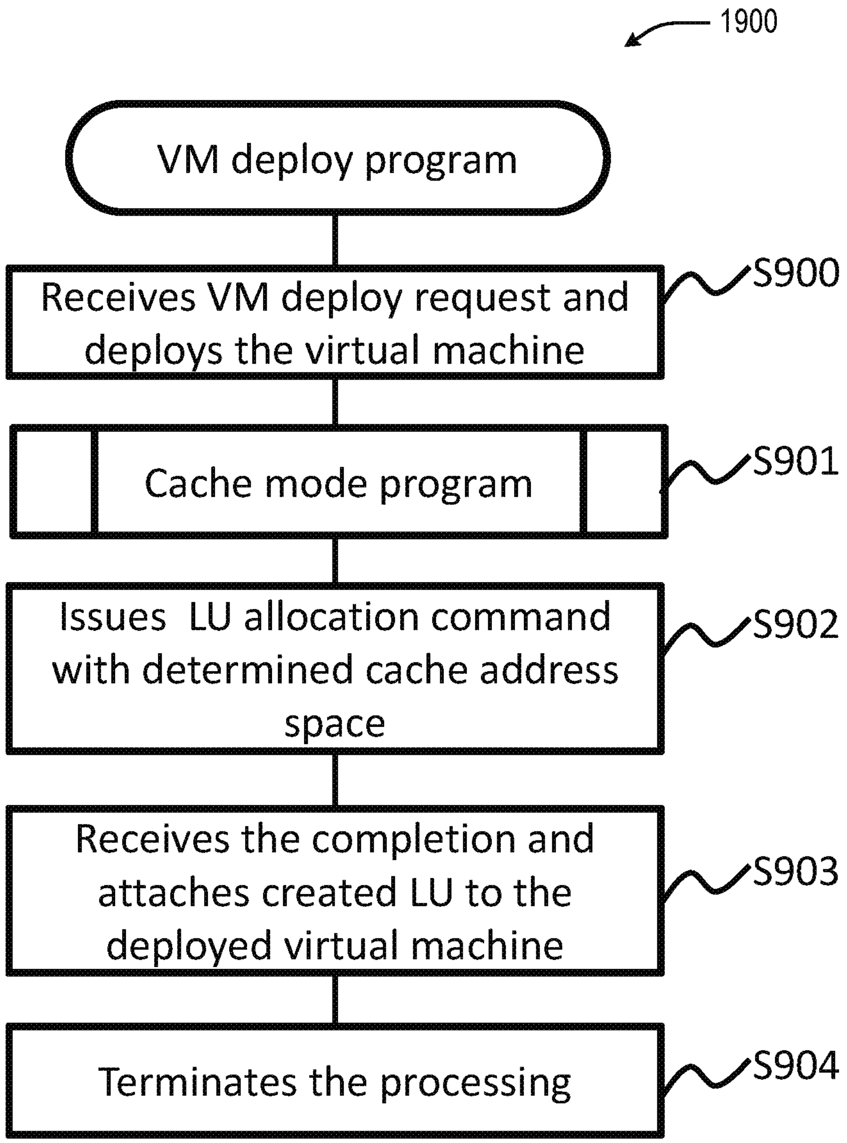
FIG. 19 is a flow diagram of processing by an example implementation of a Virtual Machine (VM) deployment program.

FIG. 19 is a flow diagram of processing by an example implementation of a VM (Virtual Machine) deployment program 1900. The VM deployment program 1900 receives virtual machine deployment request and deploys the virtual machine at S900. This is may be performed by create virtual machine image from one or more templates based on a specification from a user. The VM deployment program 1900 then calls a cache mode program 2000 (discussed in greater detail below with respect to FIG. 20) at S901. The cache mode program 2000 returns a cache address space suitable for the deployed virtual machine. The VM deployment program 1900 then issues an LU allocation command to the converged system 1 with the determined cache address space returned by the cache mode program 2000 at S902. The VM deployment program 1900 receives a completion indication and attaches the created LU to the deployed virtual machine at S903. The VM deployment program 1900 then terminates processing at S904.

Figure 20:
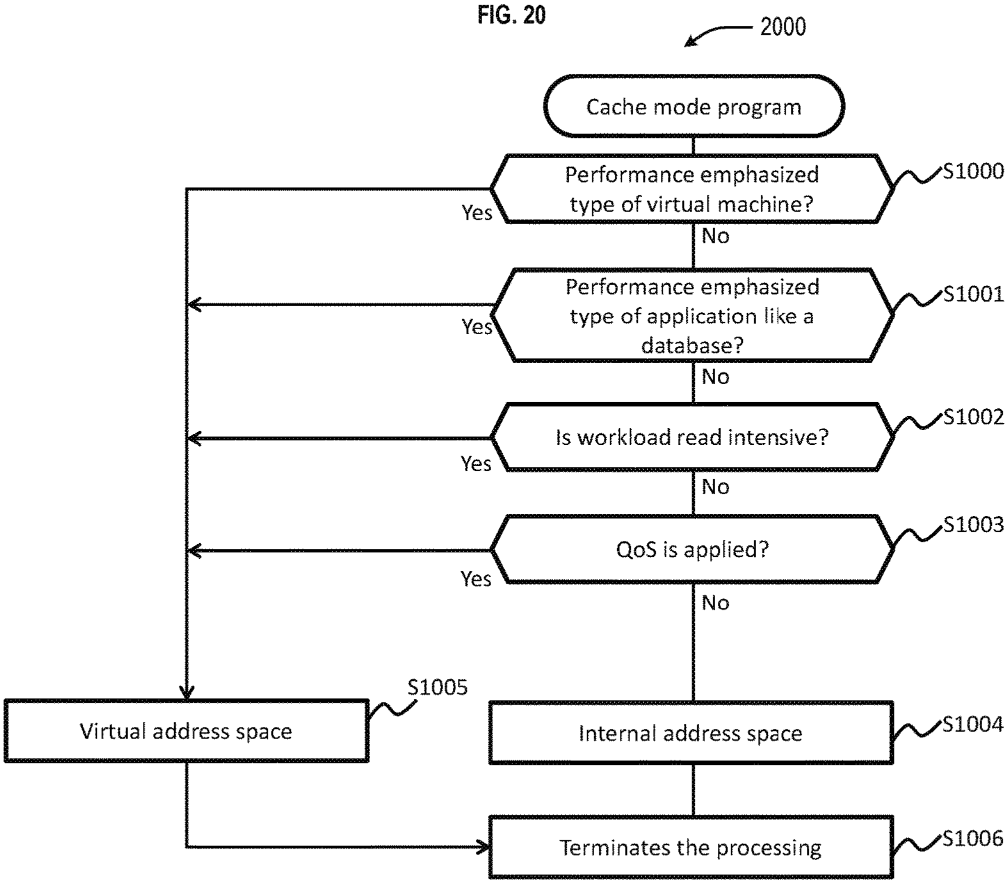
FIG. 20 is a flow diagram of processing by an example implementation of a cache mode program.

FIG. 20 is a flow diagram of processing by an example implementation of a cache mode program 2000, which determines a suitable cache address space. This cache mode program 2000 may be called by the VM deployment program 1900 during the processing of S901 in FIG. 1.

The cache mode program 2000 first checks whether the type of the deployed virtual machine is a performance emphasized at S1000. For example, a virtual machine having large amount of processor resources and memory may be considered a performance emphasized VM. Further, virtual machine template information, which may be provided by the management server or management service, can also be used to determine whether performance is emphasized. If the VM is performance emphasized (i.e. a result "yes" at S1000), the cache mode program 2000 choses virtual address space at S1005. The cache mode program 2000 then terminates processing at S1006.

Conversely, if the VM is not performance emphasized (i.e. a result "no" at S1000), the cache mode program 2000 checks whether the types of the application assigned to the VM are performance emphasized types at S1001. For example, information about the applications can be received from the user with virtual machine deployment request. If the type of application are performance emphasized (i.e. a result "yes" at S1001), the cache mode program 2000 choses virtual address space at S1005. The cache mode program 2000 then terminates processing at S1006.

Conversely, if the type of application are not performance emphasized (i.e. a result "no" at S1001), the cache mode program 2000 checks whether workload for the deployed VM is read intensive at S1002. For example, analytics workloads or information searching applications may be read intensive. If the workload of the deployed VM is read intensive (i.e. a result "yes" at S1002), the cache mode program 2000 choses virtual address space at S1005. The cache mode program 2000 then terminates processing at S1006.

Conversely, if the workload of the deployed VM is not read intensive (i.e. a result "no" at S1002), the cache mode program 2000 checks whether QoS (Quality of Service) is to be applied to the VM at S1003. If QoS is to be applied to the VM (i.e. a result "yes" at S1003), the cache mode program 2000 choses virtual address space at S1005. The cache mode program 2000 then terminates processing at S1006.

Conversely, if QoS is not to be applied to the VM (i.e. a result "no" at S1003), the cache mode program 2000 choses internal address space at S1004. Then, the cache mode program 2000 terminates the processing at S1006. Since caching with virtual address space can cache the data in the node which receives the I/O request, communication between nodes is not needed when I/O target data is cached. Thus, caching with virtual address space is suitable for virtual machines or application, which requiring greater performance.

Some portions of the detailed description are presented in terms of algorithms and symbolic representations of operations within a computer. These algorithmic descriptions and symbolic representations are the indicates used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Some example implementations may be represented in form of a computer program containing instructions. The instructions for the program may be stored in a computer readable storage medium, which includes tangible and non-transitory media such as flash memory, random access memory (RAM), Hard Disk Drive (HDD) and the like. Alternatively, instructions may be stored in the form of a computer readable signal medium, which includes other media such as carrier waves.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed:

1. A computer device comprising:

a first node, the first node comprising:

a first storage device having a plurality of first internal address spaces;

a first cache memory; and a first processor, configured to provide a virtual volume, the virtual volume having a plurality of virtual address spaces, the plurality of virtual address spaces including first virtual address spaces, which correspond to the plurality of first internal address spaces of the first storage device;

wherein the first processor is configured to cache data of a virtual address space of the virtual address spaces in a first cache space of the first cache memory by associating the virtual address space with the first cache space, and wherein the first processor is configured to cache data of a first internal address space of the plurality of first internal address spaces in a second cache space of the first cache memory by associating the first internal address space with the second cache space;

wherein, in response to receiving a command from an application to read target data stored on the first storage device of the first node when data caching is enabled for the virtual volume, the first processor is configured to:

determine if the target data has been cached to the first cache space;

allocate the first cache space to cache the target data if the target data has not been cached to the first cache space;

determine if target data has been cached to the second cache space associated with the first internal address space of the first storage device, if data caching is enabled for the first storage device;

for the data caching being enabled for the first storage device:

allocate the second cache space to cache the target data if the target data has not been cached to the second cache space;

issue a read command to the first storage device to read the target data and cache the target data to the second cache space;

transfer the target data from the second cache space to the first cache space; and transfer the target data from the first cache space to the application;

for the data caching not being enabled for the first storage device:

transfer the target data from a node having responsibility of the target data to the first cache space; and transfer the target data from the first cache space to the application.

2. The computer device according to claim 1, wherein the plurality of virtual address spaces further include a plurality of second virtual address spaces, which correspond to a plurality of second internal address spaces of a second storage device included in a second node which is coupled to the first node.

3. The computer device according to claim 1, wherein if data caching is enabled for the virtual volume, the first processor is configured to cache data of the virtual address space in the first cache space, wherein if data caching is enabled for the first storage device the first processor is configured to cache data of the internal address space in the second cache space.

4. The computer device according to claim 1, wherein, in response to receiving a command from an application to read target data stored on the first storage device of the first node when data caching is not enabled for the virtual volume, the first processor is configured to:

allocate the first cache space to cache the target data;

determine if target data has been cached to the second cache space associated with the first internal address space of the first storage device, if data caching is enabled for the first storage device;

allocate the second cache space to cache the target data if the target data has not been cached to the second cache space;

issue a read command to the first storage device to read the target data and cache the target data to the second cache space;

transfer the target data from the second cache space to the first cache space; and transfer the target data from the first cache space to the application.

5. The computer device according to claim 1, wherein, in response to receiving a command from an application to write target data to the first storage device of the first node, the first processor is configured to:

determine if data has been cached to the second cache space associated with the first internal address space of the first storage device, if data caching is enabled for the first storage device;

allocate the second cache space to cache the target data if the target data has not been cached to the second cache space;

store the target data to the second cache space; and send a completion message to the application.

6. The computer device according to claim 1, wherein, in response to receiving a command from an application to write target data to the first storage device of the first node, the first processor is configured to:

issue a write command to the first storage device to write the target data, if data caching is not enabled for the first storage device;

receive a write confirmation from the first storage drive; and send a completion message to the application, in response to the confirmation.

7. The computer device according to claim 1, wherein in response to receiving a command from an application to write target data to the virtual volume of the first node, the first processor is configured to:

determine if data has been cached to the first cache space associated with associating the virtual address space of the virtual address spaces, if data caching is enabled for the virtual volume;

allocate the first cache space to cache the target data if the target data has not been cached to the first cache space;

store the target data to the second cache space; and send a completion message to the application.

8. The computer device according to claim 1, wherein a second node coupled to the first node comprises:

a second storage device;

a second cache memory; and a second processor configured to cache data of the second internal address space of the second storage device in a third cache space of the second cache memory by associating the second internal address space with the third cache space of the second cache memory, if data caching is enabled for the second storage device.

9. The computer device according to claim 8, wherein, in response to receiving a command from an application to read target data stored on the second storage device of the second node when data caching is enabled for the virtual volume, the first processor is configured to:

determine if the target data has been cached to the first cache space;

allocate the first cache space to cache the target data if the target data has not been cached to the first cache space; and issue a read command to the second processor of the second node;

and wherein, in response to the read command, the second processor is configured to:

determine if target data has been cached to the third cache space associated with the second internal address space of the second storage device, if data caching is enabled for the second storage device;

allocate the third cache space to cache the target data if the target data has not been cached to the third cache space;

issue a read command to the second storage device to read the target data and cache the target data to the third cache space; and transfer the target data from the third cache space to the first cache space of the first node; and wherein the first processor is configured to transfer the target data from the first cache space to the application.

10. The computer device according to claim 8, wherein, in response to receiving a command from an application to read target data stored on the second storage device of the second node when data caching is not enabled for the virtual volume, the first processor is configured to:

allocate the first cache space to cache the target data; and issue a read command to the second processor of the second node; and wherein, in response to the read command, the second processor is configured to:

determine if target data has been cached to the third cache space associated with the second internal address space of the second storage device, if data caching is enabled for the second storage device;

for the data caching being enabled for the second storage device:

allocate the third cache space to cache the target data if the target data has not been cached to the third cache space, issue a read command to the second storage device to read the target data and cache the target data to the third cache space; and transfer the target data from the third cache space to the first cache space of the first node;

for the data caching not being enabled for the second storage device:

transfer the target data from a node having responsibility of the target data to the first cache space, wherein the first processor is configured to transfer the target data from the first cache space to the application.

11. The computer device according to claim 8, wherein, in response to receiving a command from an application to write data to the second storage device of the second node, the first processor is configured to:

issue a write command to the second processor of the second node; and wherein, in response to the write command, the second processor of the second node is configured to:

determine if data has been cached to the first cache space of the second cache memory of the second node associated with the second internal address space of the second storage device, if data caching is enabled for the second storage device;

allocate the first cache space of the second cache memory to cache the target data if the target data has not been cached to the second cache space;

store the target data to the first cache space of the second cache memory; and send a completion message to the first processor; and wherein the first processor is configured to send a completion message to the application in response to the completion message from the second processor.

12. The computer device according to claim 8, wherein in response to receiving a command from an application to write target data to the virtual volume of the first node, the first processor is configured to:

determine if data has been cached to the first cache space associated with associating the virtual address space of the virtual address spaces, if data caching is enabled for the virtual volume;

allocate the first cache space to cache the target data if the target data has not been cached to the first cache space;

store the target data to the first cache space;

send a write command to the second processor of the second node;

wherein, in response to the write command, the second processor of the second node is configured to:

determine if data has been cached to the first cache space of the second cache memory of the second node associated with the second internal address space of the second storage device, if data caching is enabled for the second storage device;

allocate the first cache space of the second cache memory to cache the target data if the target data has not been cached to the second cache space;

store the target data to the first cache space of the second cache memory; and send a completion message to the first processor; and wherein the first processor is configured to send a completion message to the application in response to the completion message from the second processor.

13. The computer device according to claim 1, wherein in response to receiving a virtual machine deployment request for deploying a virtual machine to the virtual volume, the virtual machine deployment request including virtual machine specification information, the first processor is configured to:

allocate the first cache space of the first cache memory for the virtual machine if the virtual machine specification information indicates one or more of:

a performance emphasized virtual machine is requested, a performance emphasized application is requested for the virtual machine, a workload read intensive virtual machine is requested, and a quality of service requirement is requested for the virtual machine;

allocate the second cache space of the first cache memory for the virtual machine if the virtual machine specification information indicates none of:

a performance emphasized virtual machine is requested, a performance emphasized application is requested for the virtual machine, a workload read intensive virtual machine is requested, and a quality of service requirement is requested for the virtual machine;

associate the virtual machine with the virtual volume.

14. The computer device of claim 1, wherein the first processor is configured to:

provide a plurality of virtual volumes including the virtual volume, each of the plurality of virtual volumes configured to have data caching enabled or not enabled based on a virtual cache mode table configured to manage a flag for each of the plurality of virtual volumes indicative of the each of the plurality of virtual volumes having data caching enabled or not enabled; and determine if the virtual volume has data caching enabled or not enabled based on referring to the flag corresponding to the virtual volume.

15. The computer device of claim 1, wherein the first node comprises a plurality of first storage devices inclusive of the first storage device, each of the plurality of first storage devices configured to have data caching being enabled or disabled based on an internal cache mode table configured to manage a flag for each of the plurality of first storage devices indicative of the each of the plurality of first storage devices having data caching enabled or disabled;

wherein the processor is configured to determine if the first storage device has data caching enabled or not enabled based on referring to the flag corresponding to the first storage device.

16. A method comprising:

providing a virtual volume, the virtual volume having a plurality of virtual address spaces, the plurality of virtual address spaces including first virtual address spaces, which correspond to a plurality of first internal address spaces of a first storage device of a first node;

caching data of a virtual address space of the virtual address spaces in a first cache space of a first cache memory by associating the virtual address space with the first cache space, caching data of the first internal address space of the plurality of first internal address spaces in a second cache space of the first cache memory by associating the first internal address space with the second cache space;

in response to receiving a command from an application to read target data stored on the first storage device of the first node when data caching is enabled for the virtual volume;

determining if the target data has been cached to the first cache space;

allocating the first cache space to cache the target data if the target data has not been cached to the first cache space;

determining if target data has been cached to the second cache space associated with the first internal address space of the first storage device, if data caching is enabled for the first storage device;

for the data caching being enabled for the first storage device:
allocating the second cache space to cache the target data if the target data has not been cached to the second cache space;
allocating the second cache space to cache the target data if the target data has not been cached to the second cache space;
issuing a read command to the first storage device to read the target data and cache the target data to the second cache space;
transferring the target data from the second cache space to the first cache space; and
transferring the target data from the first cache space to the application;
for the data caching not being enabled for the first storage device:
transfer the target data from a node having responsibility of the target data to the first cache space; and
transfer the target data from the first cache space to the application.

* * * * *